United States Patent [19]

Houston et al.

[11] Patent Number: 5,111,841
[45] Date of Patent: May 12, 1992

[54] CENTRAL VACUUM SYSTEM WALL VALVE

[75] Inventors: William S. Houston, Avon; Darwin T. McKnight, Louisville; Greg A. Bilek, Norton, all of Ohio

[73] Assignee: The Hoover Company, North Canton, Ohio

[21] Appl. No.: 618,076

[22] Filed: Nov. 26, 1990

[51] Int. Cl.[5] .................................................. F16L 5/00
[52] U.S. Cl. ...................................... 137/360; 285/159
[58] Field of Search ................ 137/360, 356, 377; 285/159

[56] References Cited

U.S. PATENT DOCUMENTS

| | | | |
|---|---|---|---|
| 3,036,170 | 5/1962 | Forney | 200/61.6 |
| 3,036,814 | 5/1962 | Stevens | 251/299 |
| 3,076,068 | 1/1963 | Racklyeft | 200/61.6 |
| 3,088,484 | 5/1963 | Marsh | 137/360 |
| 3,335,744 | 8/1967 | Hanford | 137/360 |
| 3,468,334 | 9/1969 | Hamrick | 137/360 |
| 3,565,103 | 2/1971 | Maesick | 137/360 |
| 3,754,564 | 8/1973 | Naumberg | 137/360 |
| 4,336,427 | 6/1982 | Lindsay | 200/61.6 |

FOREIGN PATENT DOCUMENTS

| | | |
|---|---|---|
| 2018006 | 10/1970 | Fed. Rep. of Germany . |
| 2654556 | 6/1978 | Fed. Rep. of Germany . |
| 934240 | 8/1963 | United Kingdom . |

*Primary Examiner*—A. Michael Chambers

[57] ABSTRACT

A central vacuum system wall valve is described which includes a valve cap capable of being pivotally cammed to open position by its interaction with the roomside hose as this hose is moved to inserted position within the wall valve.

21 Claims, 12 Drawing Sheets

CENTRAL VACUUM SYSTEM WALL VALVE

BACKGROUND OF THE INVENTION

1. Field of the Invention

This invention relates to central vacuum systems and, more particularly, relates to a wall valve for a central vacuum system.

2. Description of the Prior Art

Normally wall valves for central vacuum systems include an outwardly disposed valve cap that seals the central vacuum system at its valve location until the valve is connected to a hose or the like to be placed in an open, active condition. These valve caps are spring urged to closed position and have generally been pivoted on a vertically or horizontally extending axis so as to be capable of manual hinging away from the valve so that they can be opened for hose insertion. Such pivoting, however, is somewhat cumbersome, both, because the user must use both hands, one on the valve cap and one on the hose, and because the valve cap is, by spring urging, tending to swing towards closed position while the hose, or its coupling, is being inserted in a separate motion. It would, therefore, be advantageous to provide a valve cap in a central vacuum system which provides for more easy insertion of the coupled hose.

Further, known wall valve configurations are sometimes difficult to mount to accommodate varying wall thicknesses and still allow unimpeded use of a connecting hose. It, therefore, also would be advantageous to provide a simplified and easily mounted wall valve configuration easily adjustable to a variety of wall thicknesses.

Accordingly, an object of this invention is to provide a central vacuum system wall valve with improved coupling to the hose.

Another object of this invention is to provide a valve cap for a wall valve that is cammed to open position by manipulation of the hose coupling.

It is a further object of the invention to provide a cammable valve cap pivotably swingable to provide egress to a wall valve for connection of a hose or the like.

It is a still further object of the invention to provide a cammable valve cap swingable on an axis parallel to an axis of a connecting hose to limit interference between them.

It is an even further object of the invention to provide a valve structure capable of accommodating different wall thicknesses so, e.g., its valve plate may operate satisfactorily.

It is an additional object of the invention to provide an improved wall valve for use with a central vacuum system.

SUMMARY OF THE INVENTION

The valve assembly includes a wall plate having an open box like structure that has at least one sidewardly extending flange, a rearwardly extending conduit coupling section attached to a central vacuum system and a forwardly extending conduit section having a port disposed outwardly of the room wall containing the central vacuum system. The sidewardly extending flange is screwingly attached to studding in the room wall while the forwardly extending conduit section is chosen to have sufficient length so as to accommodate varying wall board thicknesses. The rearwardly extending coupling is connected to the central vacuum system by gluing or the like to a supply conduit running through the room wall and forming a part of this system.

The valve port has a pivoting valve cap disposed over it which, when closed, prevents leakage to the central vacuum system when the valve is not in use. The valve cap pivots on an axis parallel to the axis of hose insertion and is cammed by movement of the hose downwardly along a face plate of the valve immediately prior to hose coupling insertion. The valve cap includes on its outer surface as an aid to this insertion at least one cam surface that is engaged by the hose, forcing the valve cap to a non obstructing port uncovering position. Several embodiments of this structure are shown.

The hose coupling conventionally includes on its cylindrical surface a pair of contacts which may engage a pair of contacts in the valve to close a central vacuum system circuit to initiate operation of its suction fan and motor. Although not shown, a short cord extension (conventional) may also be plugged into the hose coupling and a conventional electrical receptacle on the wall to provide current to a power nozzle which may, if desired, be imposed on the far end of the hose.

A spacer plate having varying sizes of extended bosses is included with these bosses selectively abutting with or telescoping with bosses disposed on the wall side of the face plate to space the face plate a sufficient distance from the room wall so that it properly mates with the end of the valve assembly conduit section on the room side.

BRIEF DESCRIPTION OF THE DRAWINGS

Reference may now be had to the accompanying Drawings for a better understanding of the invention, both as to its organization and function, with the illustration being of a preferred embodiment, but being only exemplary, and in which.

DETAILED DESCRIPTION OF THE INVENTION

Figure 1:
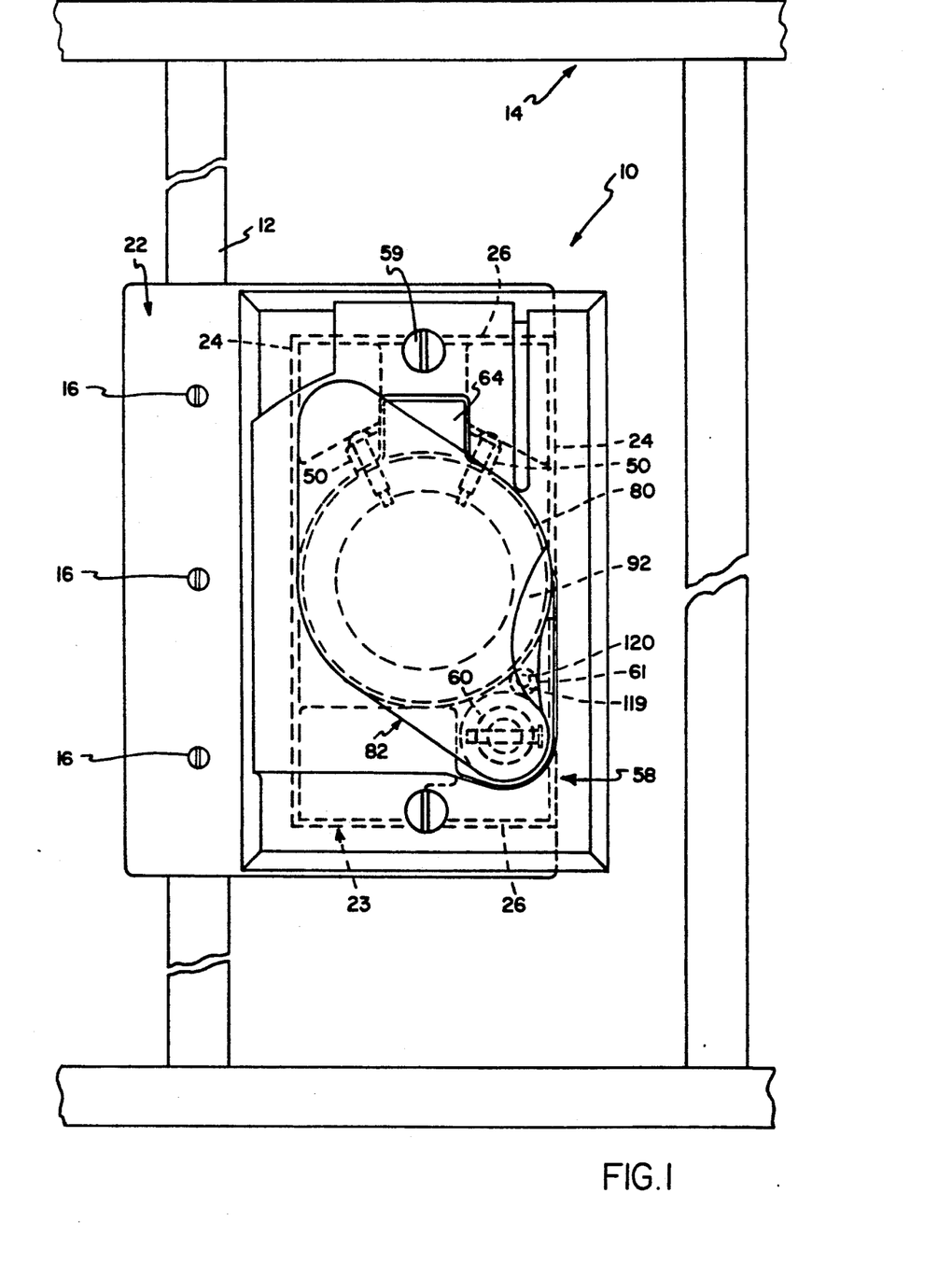
FIG. 1 is a front elevational view of the wall valve of the first embodiment of the invention with the wall valve closed and showing the wall valve mounted conventionally to studding with the room wall removed.

There is shown in FIG. 1, a wall valve 10 of a central vacuum system 11 (FIG. 5) mounted to a wall stud 12 of a room wall 14 by a plurality of screws 16 so that the wall valve is securely positioned for connection to a hose coupling 18 of hose 17 (FIG. 5) that extends inwardly to be connected to a conventional nozzle or the like (not shown) for cleaning purposes.

Figure 7:
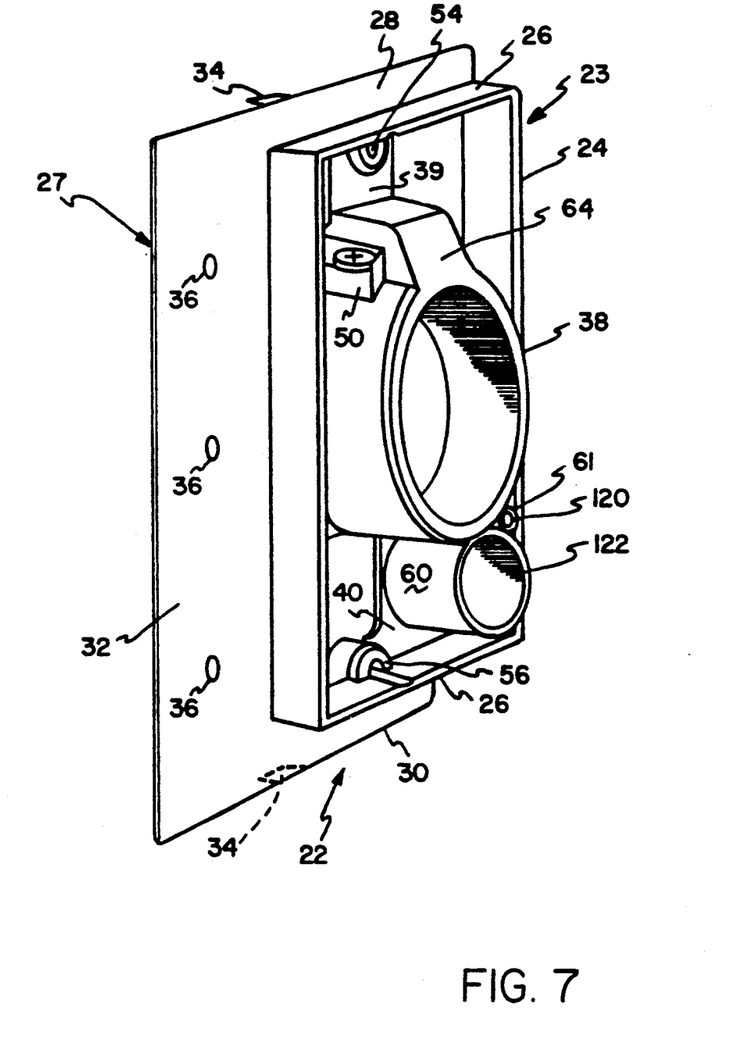
FIG. 7 is a perspective view of the wall plate of the valve with the face plate removed.

A house installed central vacuum system conduit 20 is connected to a wall plate 22 of wall valve 10 (FIG. 7) and is partially formed with an open box like configuration 23 shaped by outwardly extending vertical walls 24, 24, joined to outwardly extending horizontal walls 26, 26. This box like configuration is bordered by a flat plate piece 27 that is rearward of the open box like configuration 23 and extends transversely to the walls 24, 24, 26 and 26 above, below and sidewardly of these walls to form an upper flange 28, a lower flange 30 and a sidewardly extending flange 32. These transversely extending flanges add strength to the wall plate 22, afford room for the location of stud positioning tabs 34, 34 and permit mounting holes 36, 36, 36 for screws 16, 16, 16 to be provided.

Wall plate 22 also includes a cylindrical coupling piece 38 which extends on both sides of the flat plate piece 27 and the flanges 28, 30 and 32 within the open box like configuration 23 and is joined to its backside of the open box like configuration 23 by a series of web like ribs including ribs 39, 40. Cylindrical coupling piece 38 telescopically receives a hollow, front cylindrical portion 42 of hose coupling 18 within it (FIG. 5), with the cylindrical coupling piece including an inwardly tapered wall 44 to insure a frictional airtight fit between these two elements. Cylindrical coupling piece 38 also includes an outer cylindrical wall 46, spaced from inwardly tapered wall 44 to rigidify the structure. The central vacuum system hose conduit 20 is received telescopically over rear portions of cylindrical coupling piece 38 and glued or the like to cylindrical coupling piece 38 to form a reasonably permanent airtight seal for this portion of the central vacuum system.

A pair of mounting blocks 50, 50 are disposed on the upper, outer side of cylindrical coupling piece 38 (FIG. 7) to mount contact screws 52, 52 which are electrically connected to the house wiring (not shown). These screws are mounted to extend out the upper, outer side of the blocks 50. Each of these screws also extends through its block 50 and the cylindrical coupling piece 38 (not shown) into a bore 53 formed by the inside surface of tapering walls 44 to electrically engage (not shown) front portion 42 of hose coupling 18, as is conventional in the art, to provide power to the nozzle or the like (not shown) utilized for cleaning purposes.

The wall plate 22 is completed by a pair of upper and lower screw bosses 54, 56 (FIG. 7), utilized to mount a face plate 58 by screws 59, 59, (FIG. 1) a valve door mounting boss 60, a pin mounting boss 61 which non rotatably fixes the valve door cam tracking arrangement, and an outwardly angled guiding piece 64 which provides an angled plane that aids in location of hose coupling 18 when it is mated with wall valve 10.

Figure 9:
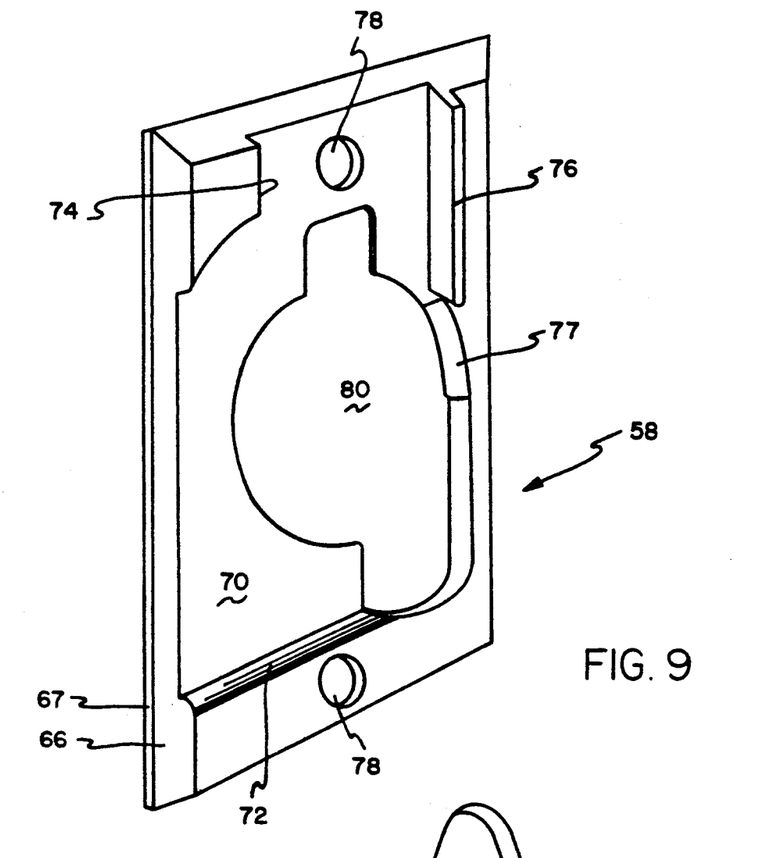
FIG. 9 is a perspective view of the front plate and showing its hose coupling camming guidance.
Figure 12:
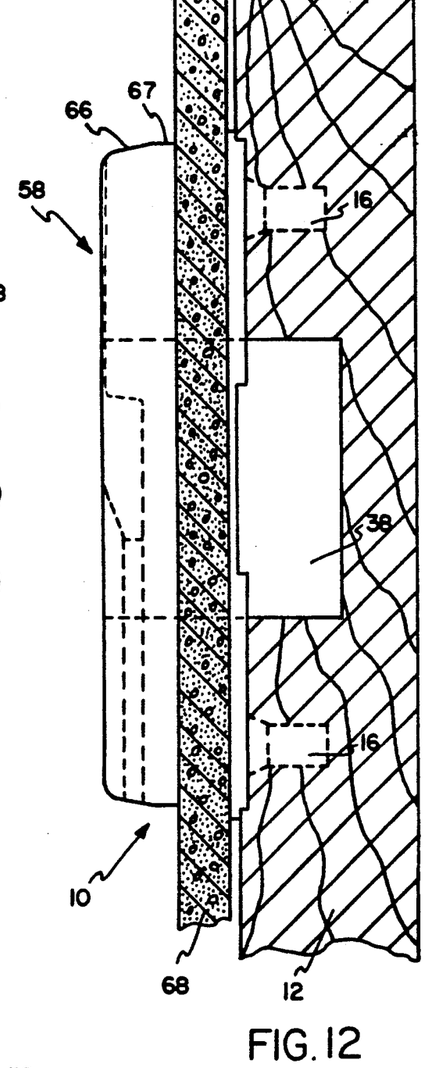
FIG. 12 is a side sectional elevational view of this wall valve mounted to a room wall.
Figure 13:
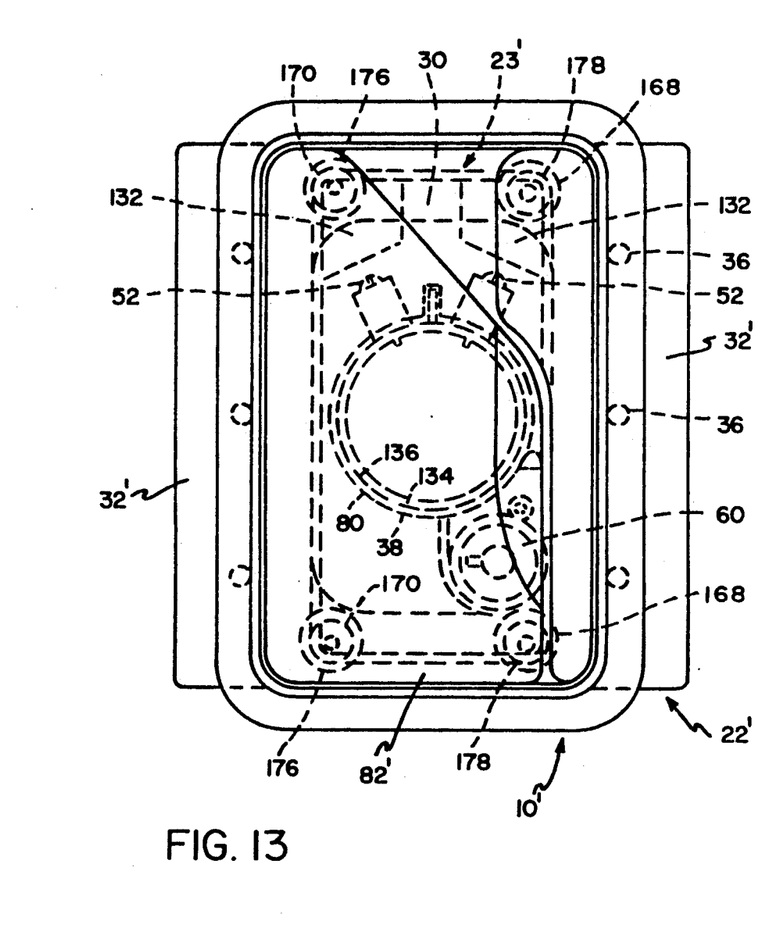
FIG. 13 is an elevational view of a second embodiment of the invention with the valve door closed and showing the spacer plate in place.
Figure 14:
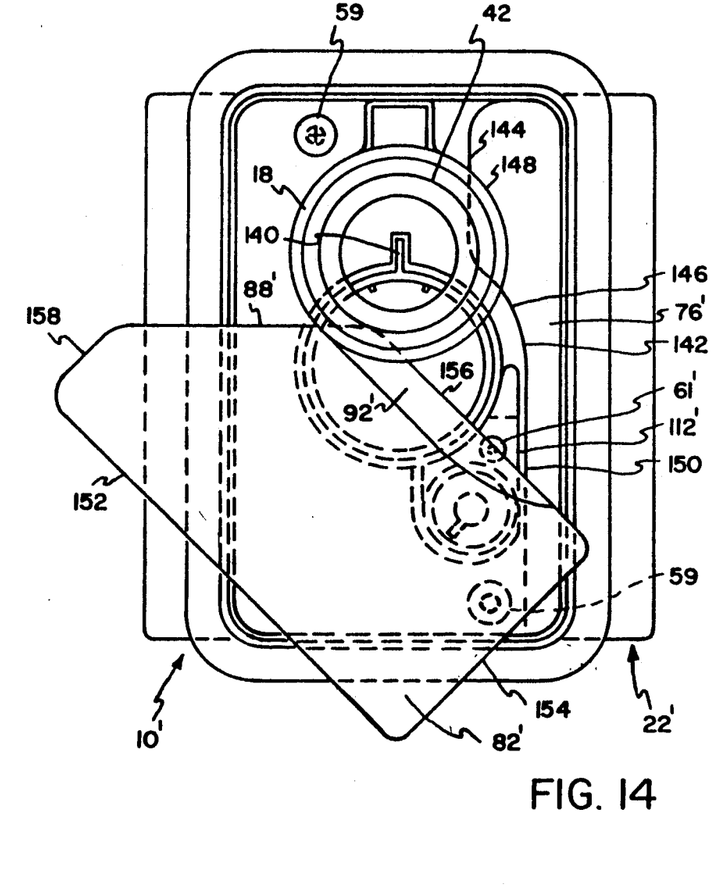
FIG. 14 is a view of the second embodiment with the valve door partly cammed open.

Face plate 58 (FIG. 9) includes an outwardly angled flanged border 66 extending around its periphery that terminates inwardly in a flat border 67 transverse to the room wall. This face plate abuts against a room wall 68 (FIG. 12) when mounted properly to wall plate 22 through screw holes 78, 78 to provide a pleasing appearance to the mounted wall valve 10. The face plate 58 (FIG. 7) includes an inwardly indented portion 70 formed by a bottom straight side 72, an upper left side 74, vertical at its top and curved outwardly below it and an outwardly and vertically extending integral rib 76, spaced from the vertical portion of upper left side 74 to permit insertion of the front portion 42 of hose coupling 18 therebetween. A thickened curved portion 77 on face plate 58 accommodates hose coupling 18. The indented portion 70 of face plate 58 also includes an aperture 80, more or less centrally located in indented portion 58. This aperture is shaped to accommodate the inserted cylindrical coupling piece 38 of wall plate 22, the inserted guiding piece 64 above it and the inserted extending valve door mounting boss 60 and adjacent allied structure.

Figure 10:
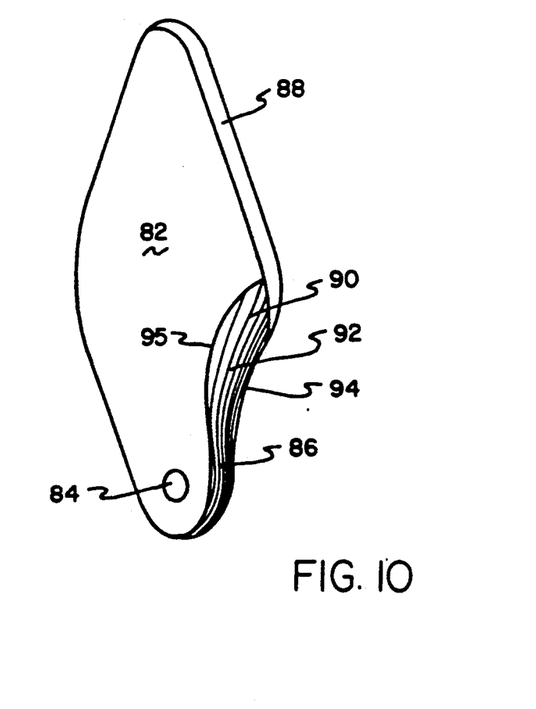
FIG. 10 is a perspective view of the cammable valve door.

A valve door 82 (FIG. 10) is swingably disposed over the aperture 80 by being pivotally attached to valve door mounting boss 60 through a pin bore 84 disposed in it. The valve door 82 is somewhat lozenge shaped (for symmetry, somewhat) with the pin bore disposed in a lower tip 86 of the lozenge shape. An upper right side 88 of the lozenge shape forms an angled cam for the downward insertion of hose coupling 18 between the upper left side 74 and vertical rib 76 of face plate 58. Beneath this upper right angled side 88 of valve door 82 is a second lower right angled side 90, angled in the opposite direction to angled side 88. It includes a curved cam surface 92 that is also angled outwardly toward a curvilinear outer 94 edge of angled side 90, with the degree of steepness of the cam surface 92 increasing as it approaches more closely to the pin hole 84 to increase the angle of attack of the abutting hose coupling as it bears against a shorter and shorter effective lever arm of the face plate 58 to enable further opening pivoting of it. To help provide this changing angle of attack an innermost edge 95 of cam surface 92 is also curvilinear.

Figure 8:
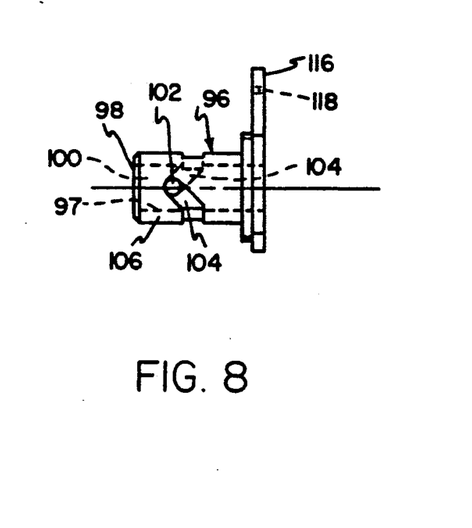
FIG. 8 is an elevational view of the valve door cam shaft and integral cam slot.
Figure 11:
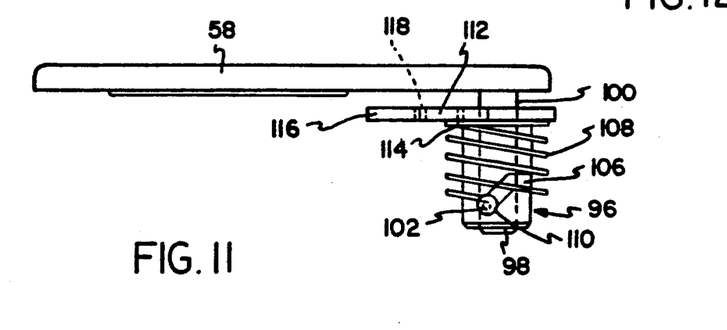
FIG. 11 is a side elevational view of the door, its pivot pin post, camming shaft and urging spring.

A cylindrical cam piece 96 (FIGS. 8 and 11) includes a capped inner end 98 but it is otherwise hollow to receive rotatably in a bore 97 therein a pivot cammed pin 100 which is fixed in pin bore 84 to move with face plate 58. Pivoted cam pin 100 carries, adjacent its bottom end, a cross pin 102 that extends transversely to its axis and juts slightly outwardly of its cylindrical periphery. Cross pin 102, at each of its extending ends, is disposed in cam tracks 104, 104, each angled upwardly around the periphery of cylindrical cam piece 96 and being formed as slots through a peripheral wall 106 of this cylindrical cam piece. A torsion spring 108 is connected at one of its ends to a transversely extending end 110 of cross pin 102 and to a fixing piece 112 through a spring end 114.

Fixing piece 112 includes an extending end 116 having a bore 118 for receiving a pin 119 (FIG. 1) which also is received in a bore 120 in pin mounting boss 61, integral with wall plate 22. This pin connection fixes cylindrical cam piece 96 within a bore 122 of valve door mounting boss 60 so it remains non rotatably stationary when wall plate 22, to which it is mounted, swings open or closed.

A seal 124, mounted to valve door 82, may be utilized to insure proper sealing between it and the indented portion 70 of face plate 58.

The operation of the wall valve 10 should now be obvious. The valve door 82 is spring urged closed by torsion spring 108. As it moves to closed position, cross pin 102 moves pivotally inwardly towards the room wall 68, along the slotted cam track 104. Pivoted cam pin 100 carries with it valve door 82 so that the door assumes a closed position over aperture 80 (FIG. 1) with the seal 124 engaging against face plate 58.

Figure 2:
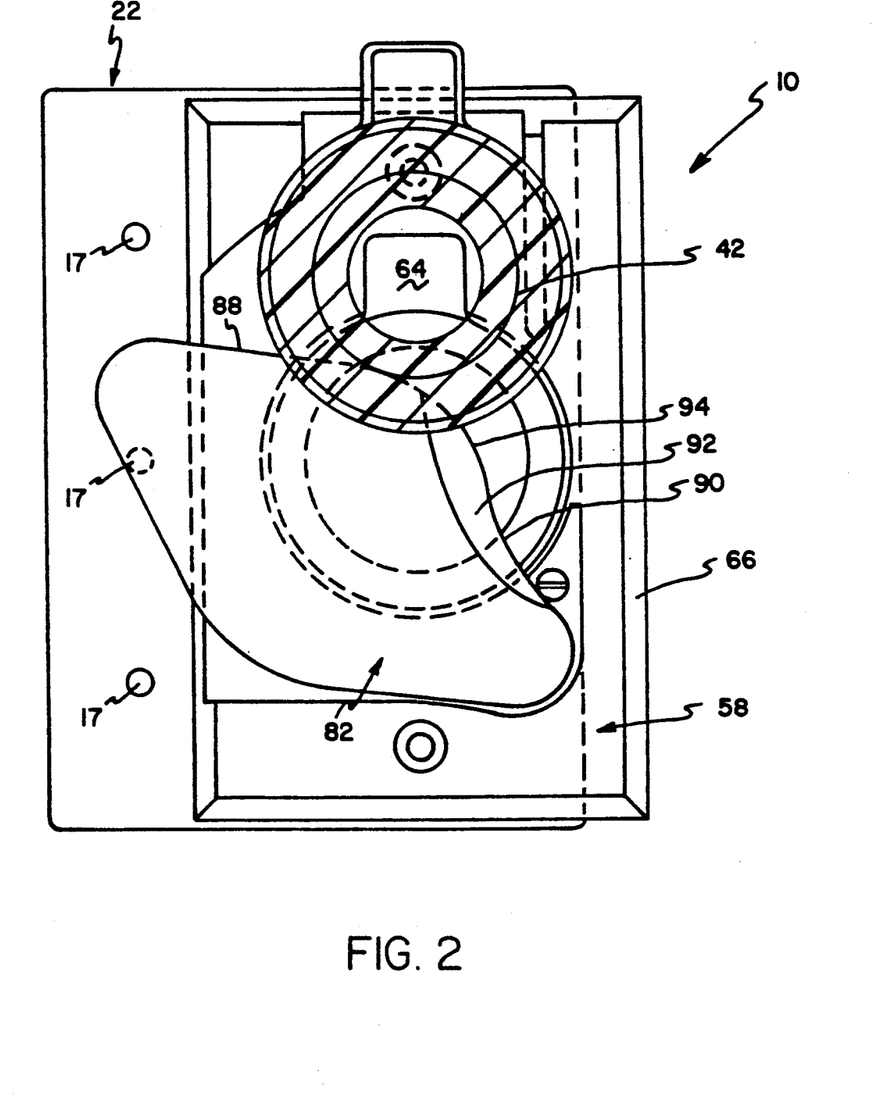
FIG. 2 is a similar view of the unmounted wall valve with the wall valve moved to partly open position by hose coupling urging.
Figure 3:
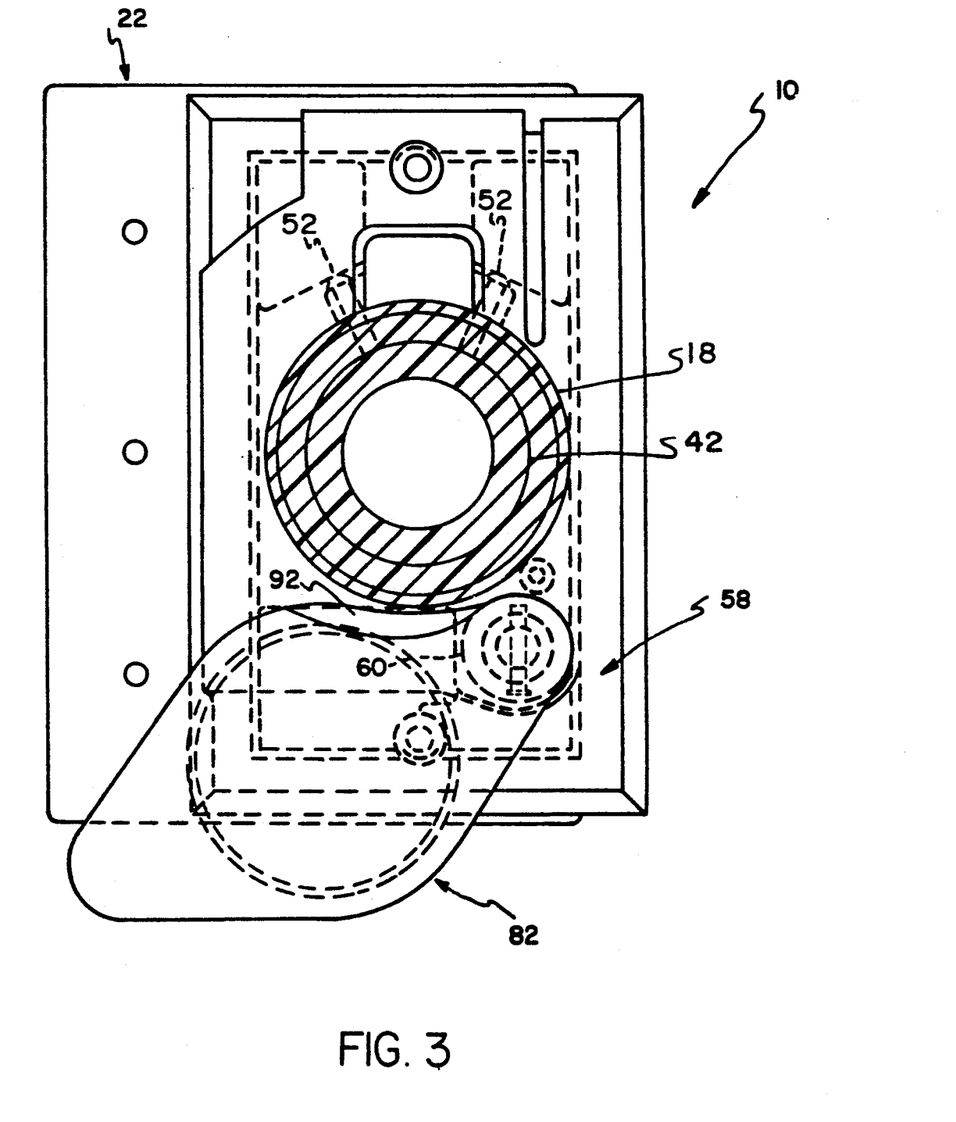
FIG. 3 is a similar view with the hose coupling fully inserted and the valve fully open.
Figure 4:
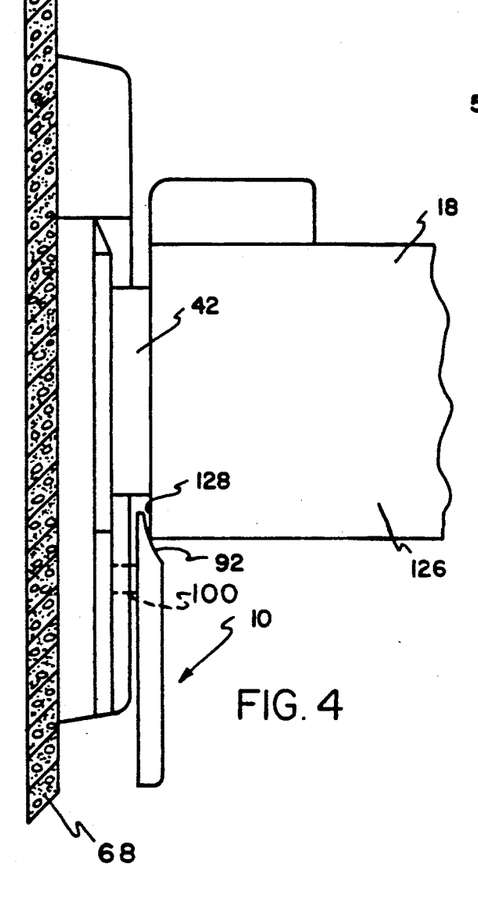
FIG. 4 is a somewhat schematic side view of the mounted wall valve and hose coupling nearly totally inserted.
Figure 5:
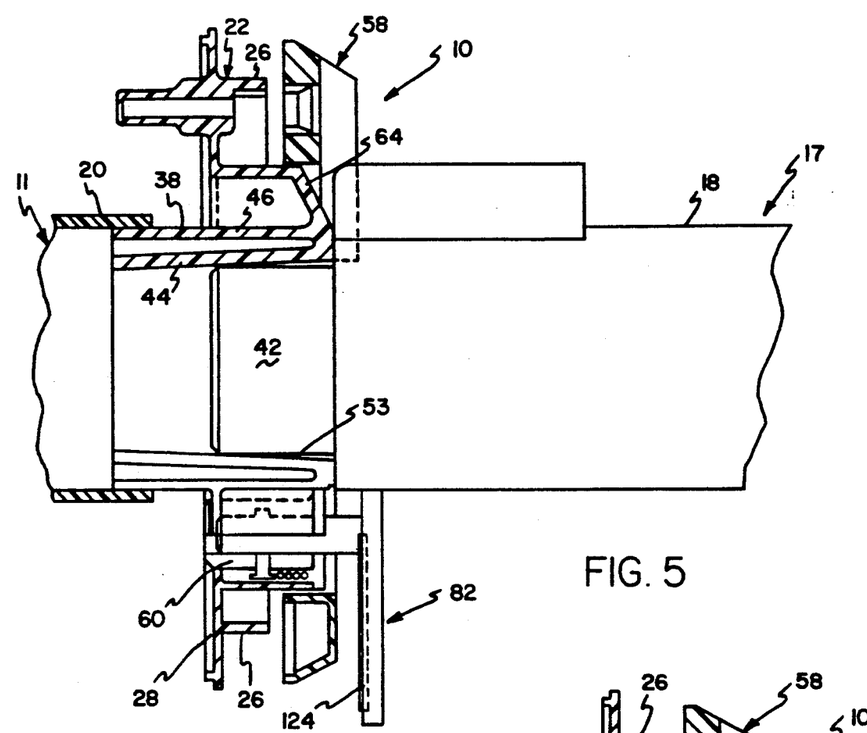
FIG. 5 is a cross sectional vertical elevation view of the valve with the valve plate open as in FIG. 3.
Figure 6:
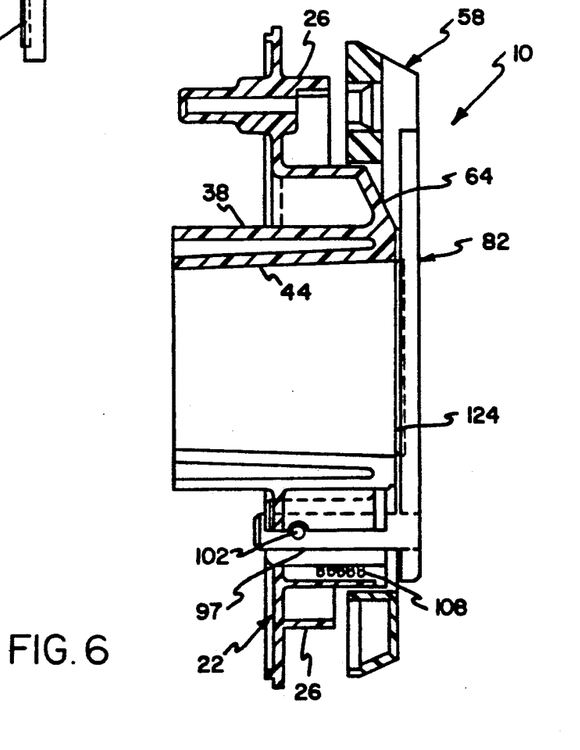
FIG. 6 is a cross sectional vertical elevational view of the valve with the valve plate fully closed as in FIG. 1.

In order to insert hose coupling 18 into cylindrical coupling piece 38 to obtain a vacuum supply, the front portion 42 of hose coupling 18 is placed against the front top portions of face plate 58 between upper left side 74 and rib 76 and then moved downwardly, as guided by these two elements, until it abuts angled upper right side 88 of face plate 58 to cam it against its spring loading counterclockwise to a position slightly passed that shown in FIG. 2. At this point, front portion 42 of hose coupling 18 next engages against edge 94 of lower right angled side 90 of valve door 82 and then as it clears the face plate 58, telescopically enters the hollow cylinder formed by tapered wall 44 of cylindrical coupling piece 38. Next, a large portion 126 of hose coupling 18, through an abutting face 128, engages cam surface 92 of valve door 82 (FIG. 4), camming the valve door further counterclockwise so that the hose coupling 18 may be fully inserted in cylindrical coupling piece 38 (FIGS. 3 and 5). Since the valve door 82 is moving away from wall plate 22 during its camming motion (the linear action or lead of cam slot tracks 104) as driven by hose coupling 18 it easily clears the outwardly jutting portion of wall plate 22 below bottom straight side 72.

The hose coupling 18 may obviously be easily removed from wall valve 10 against the slight friction imposed by torsion spring 108.

The second embodiment of the invention is shown in FIGS. 13-17 and represents an improved wall valve over that depicted in FIGS. 1-12. Similar numbers are utilized in FIGS. 13-17 to depict the same elements as those shown in FIGS. 1-12, while primed numerals are utilized to illustrate slightly differing elements.

There is shown in these Figures a wall valve 10' including a wall plate 22' having an open box like configuration 23' extending forwardly of a generally solid back wall surface 130 except for upper cutouts 132, 132 which permit the passage of conductors (not shown) outwardly to mounting screws 52, 52 mounted on the upper side of a cylindrical coupling piece 38'. Cylindrical coupling piece 38', on an inner room wall side extending end 133 has an internal shoulder 134 against which the central vacuum system piping abuts when inserted in a bore 136. Again, gluing or the like may be utilized to connect these two elements. Wall plate 22' also includes a valve door mounting boss 60.

In order to more flexibly mount the wall plate 22' either leftwardly or rightwardly relative to a wall stud 12, a pair of sidewardly, leftwardly and rightwardly and vertically extending mounting flanges 32', 32' are provided on the wall plate 22'. Each of these includes mounting holes 36, 36, 36 for conventionally screw mounting the wall plate 22' to the studding in a wall 14 on which it is mounted. A pair of locating pins 137, 137 are utilized in this embodiment of the invention in lieu of stud positioning tabs 34, 34.

Disposed outwardly of wall plate 22' is a face plate 58' which is mounted to wall plate 22' by screws 59, 59 located against the upper left and lower right corners of wall plate 22'. This face plate does not directly abut against the open box like configuration 23 of the wall plate, as in the first embodiment, but is spaced from this plate by a spacer 138 which will be described in more detail later.

Face plate 58' includes an aperture 80' which is shaped to receive the inserted cylindrical coupling piece 38', an upper locating tab 140 on this cylindrical coupling piece, the valve door mounting boss 60 and adjacent allied structure including pin mounting boss 61' which mount the cylindrical cam piece 96 within valve door mounting boss 60.

Face plate 58' includes guidance for the downwardly moved end 42 of hose coupling 18 on only one side. This is furnished by a guidance edge 142 provided by an integral rib 76'. Guidance edge 142 includes an upper vertically extending straight edge portion 144, below which is an outwardly curved portion 146 having a radius centered and in general conformance with an outer circumference 148 of hose coupling 18 (in inserted position) and a lower vertical extending straight edge 150 which is generally tangential to the lower termination of outwardly curved portion 146.

A valve door 82' is utilized to provide additional guidance for hose coupling 18 as it is mated with wall valve 10' by including an angled camming surface formed by an angled upper right edge 88', with the upper termination of this edge being at the same height as the upper termination rib 76' with the valve door 82' closed. Thus, the valve door 82' is much extended upwardly relative to the valve door 82, for this purpose, and also much extended downwardly and sidewardly relative to the valve door 82 to provide a straight outer vertical extending side 152, straight lower horizontal extending side 154 and inner vertically extending side 156. The valve door 82' is completed by a short upper horizontally extending side 158 so that the valve door 82' has a generally more desirable, conventional rectangular "door shape" except for the necessary camming surface afforded by upper right edge 88'. It should be noted that it is also convex in side elevation to visually minimize its thickness when seen from above by a room occupant.

Figure 15:
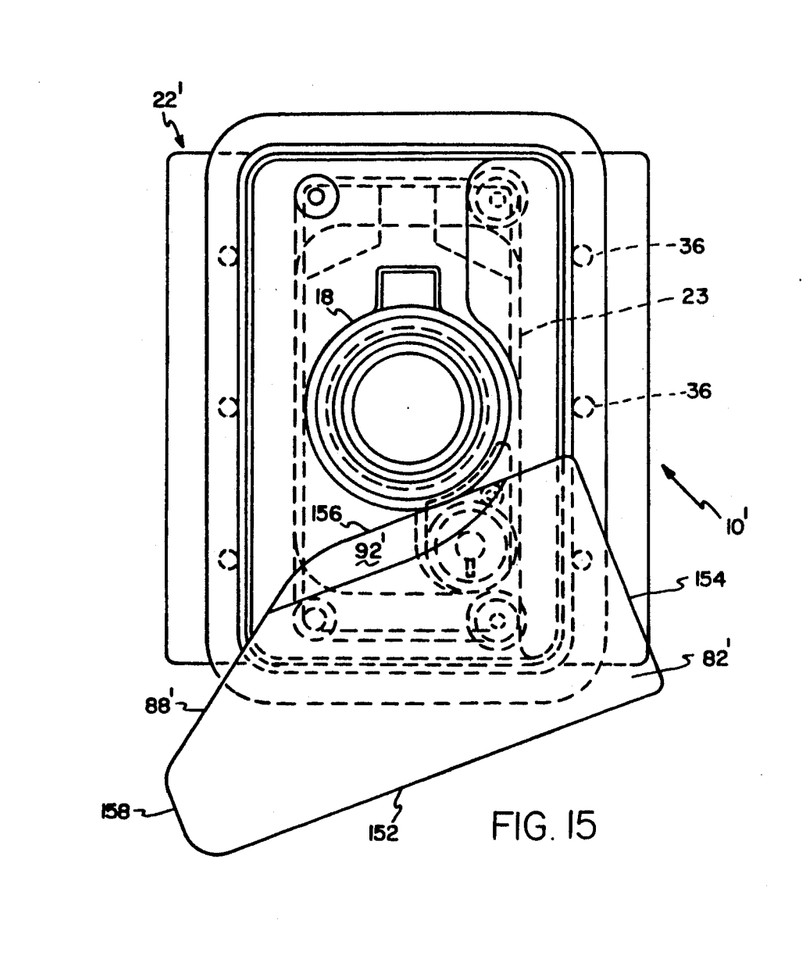
FIG. 15 is a view of the second embodiment with the hose coupling inserted and the valve door fully cammed to open position and showing the spacer plate in place.
Figure 16:
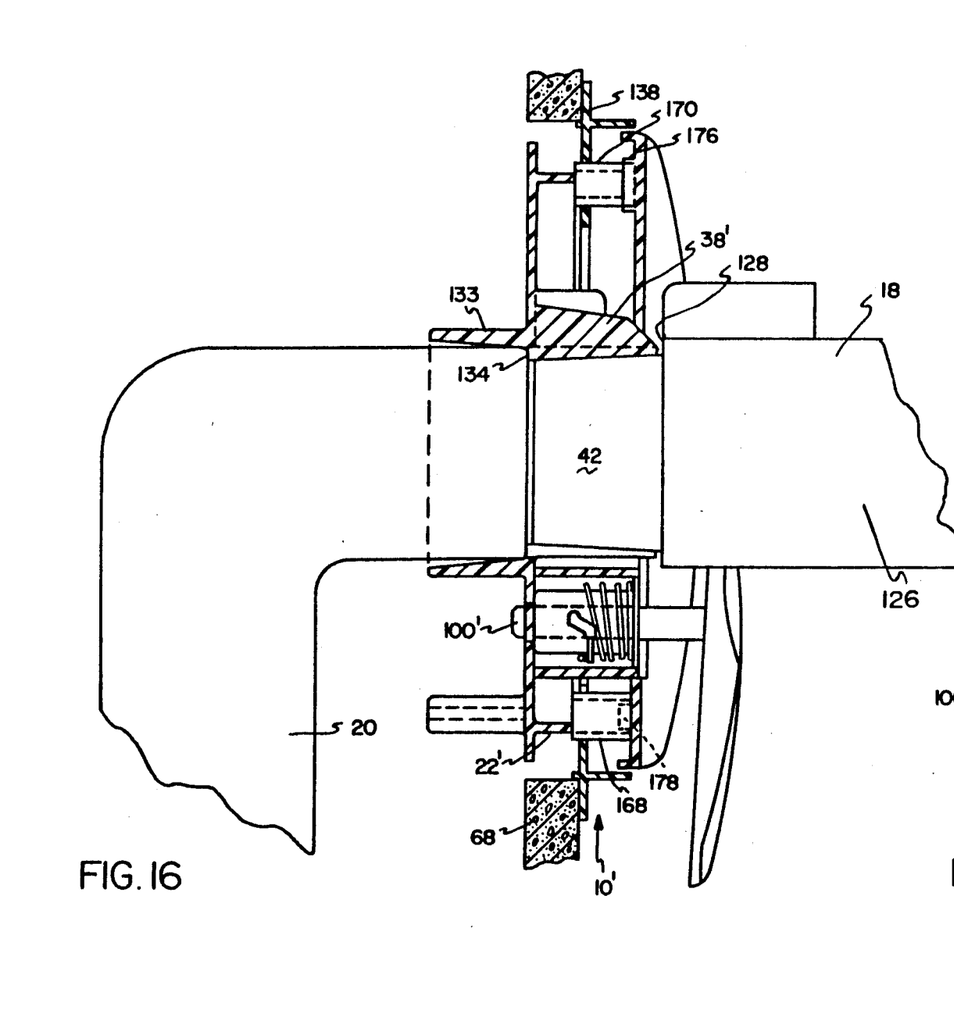
FIG. 16 is a plan sectional view of the wall mounted valve plate, the spacer plate, the engaged hose coupling and the connection to the central vacuum system.
Figure 17:
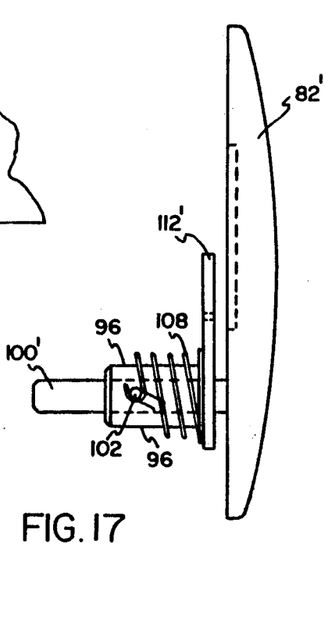
FIG. 17 is a side elevational view of the valve door, its pivot pin post, camming shaft and urging spring.

The pivoted camming of the valve door 82' is occasioned by a pivoted cam pin 100' which is essentially the same as the pin 100 except that it has been advantageously lengthened axially so that it provides a bearing surface for pivoting of valve door 82', even in its fully cammed out state (FIG. 15).

The operation of the second embodiment of the invention should now be clear. Valve door 82' goes from a fully closed condition (FIG. 13) to a cammed position (FIG. 14) with the inner end 42 of the hose coupling 18 disposed between the clockwise resiliently urged valve door 82' and the integral vertical rib 76' until the inner end 42 of hose coupling 18 telescopes into cylindrical coupling piece 38'. At this time abutting face 128 of inner end 42 abuts a cam surface 72' on valve door 42' (i.e., such as FIG. 4) to move valve door 42' further counterclockwise and permit full insertion of hose coupling 18 in wall valve 10' (FIG. 15).

Figure 18:
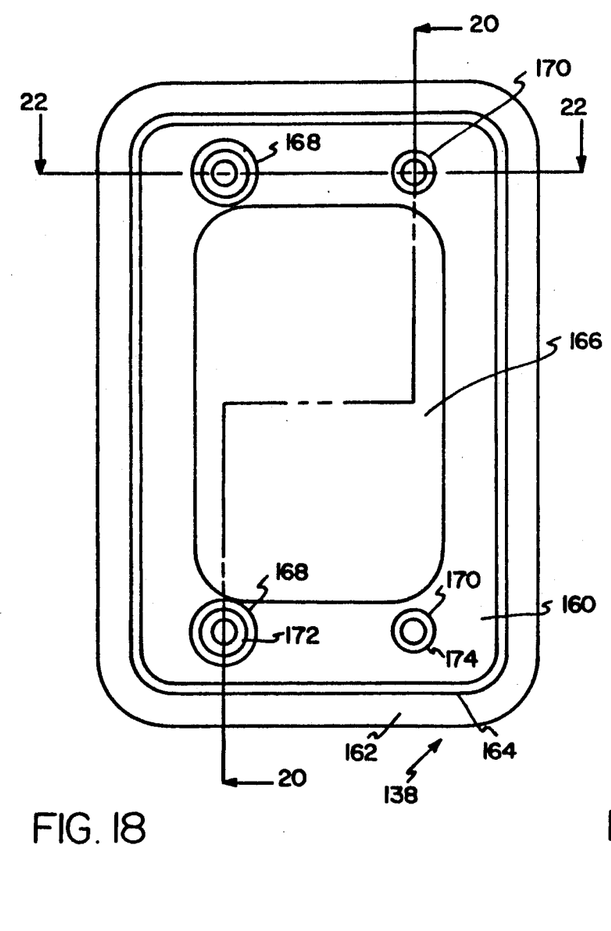
FIG. 18 is a plan view of one side of a spacing plate utilized with the second embodiment of the invention.
Figure 19:
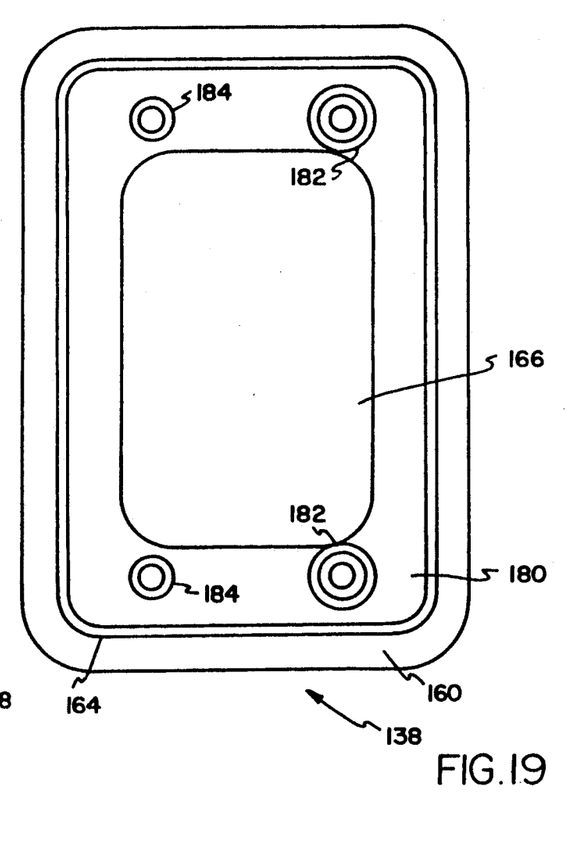
FIG. 19 is a plan view of the other side of the spacing plate utilized with the second embodiment of the invention.
Figure 20:
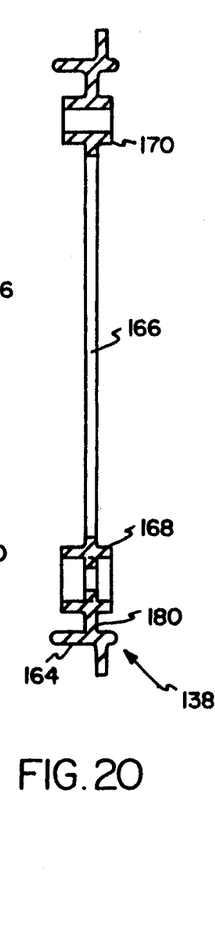
FIG. 20 is a cross sectional view of the spacer plate taken on line 20—20 of FIG. 18.
Figure 21:
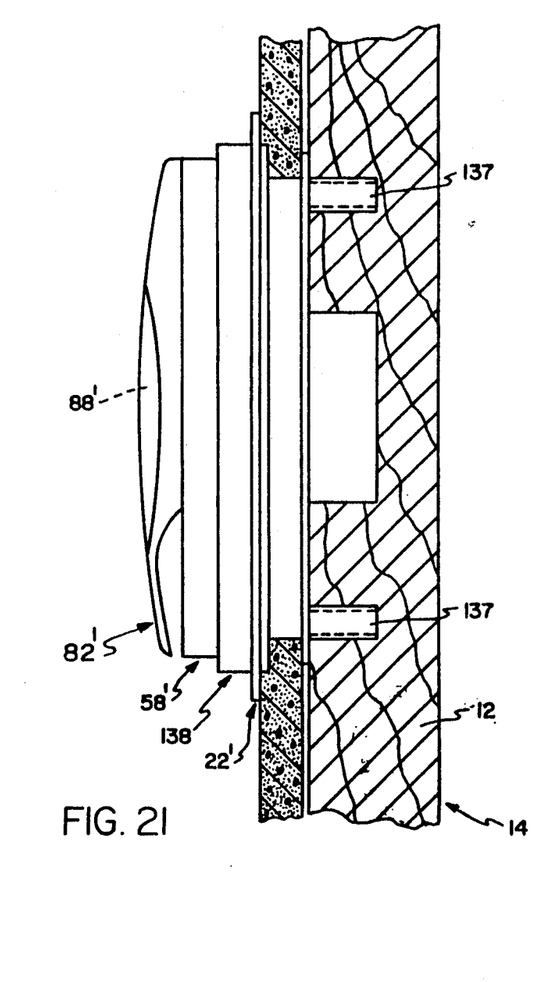
FIG. 21 is a cross sectional view of the spacer plate and wall valve of the second embodiment of the invention mounted to a room wall.

There is shown in FIGS. 18-20 the spacer plate 138 utilizable with, for example, in the second embodiment. This spacer plate is of a generally apertured, flat planar configuration 160 and includes on a first side face 162 an inset border flange 164 extending transversely to the general extent of the flat planar configuration 160 and outwardly of side face 162 and around its four sides. It also includes a rectangular aperture 166, centered in the spacer 138. The inset border flange 164 extends through a rectangular hole (not shown) cut in the room wall 68 (e.g., wall board) and the aperture 166 is sized sufficiently to pass those elements jutting out of wall plate 22' such as cylindrical coupling piece 38 and valve door mounting boss 60.

A series of spaced hollow bosses 168, 168, 170, 170 are disposed to extend outwardly from the side face 162, with the bosses 168, 168 vertically aligned on the spacer plate 138, inwardly of the border 164 and along one vertical side of the spacer plate 138, and the bosses 170, 170 vertically aligned on the spacer plate 138 inwardly of the border 164 and along the other vertical side of the spacer plate 138. The bosses 168, 168 are larger and each include a bore 172 of the same diameter as the diameter of the outer surface of an outer cylindrical wall 174 of each of the smaller bosses 170. The bosses 168, 168, 170 and 170 are also identical in height.

On the wall plate 22' (FIG. 13), it can be seen that it contains, on its back side, a pair of vertically aligned large hollow bosses 176, 176 along one of its sides and a pair of smaller hollow bosses 178, 178. The outer diameter of the small bosses 178, 178 fits precisely into the hollow diameters of the large bosses 168, 168 on spacer plate 138 and, also, the small bosses 170, 170 fit precisely into the hollow diameters of the large bosses 176, 176 on wall plate 22'. Also the large bosses 168, 168 are spaced apart a distance equal to the spacing between the large hollow bosses 176, 176, the small bosses 170, 170 are spaced apart a distance equal to the spacing between the small hollow bosses 178, 178 and the aligned large and small bosses 168, 170 are spaced a distance apart equal to the spacing between the aligned large and small hollow bosses 176, 178. Also the outer diameters of the large bosses 168, 168 and the large hollow bosses 176, 176 are identical and the diameters of the small bosses 170, 170 and small hollow bosses 178, 178 are identical.

Figure 22:
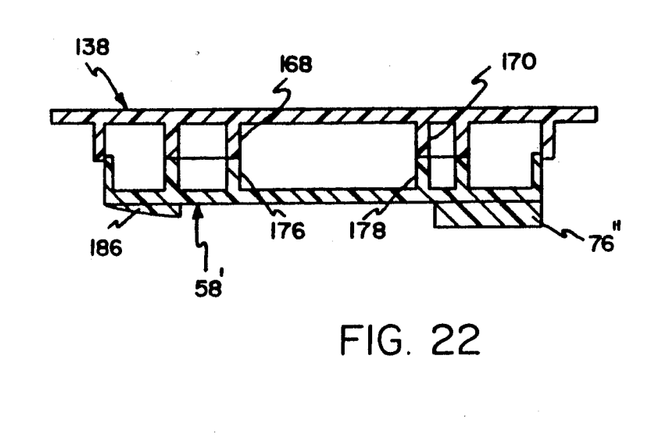
FIG. 22 is a cross sectional view showing the relationship of abutting confronting bosses on the wall and spacer plates and taken generally on line 22—22 of FIG. 18.

Thus, the large and small hollow bosses 168, 168, (spacer plate 138) 178, 178 (wall plate 22') and the small and large hollow bosses 170, 170, (spacer plate 138) 176, 176 (wall plate 22') can be nested to provide for one spacing for locating the valve door 82', mounted with the wall plate 22', at one depth relative to the wall 68. Thereby the extending room side termination of the cylindrical coupling piece 38 (FIG. 16) is accommodated. A second depth can be obtained by turning the spacer plate 138 around the axis of its aperture 166 (without turning to the opposite side face 180 of spacer plate 138) so that the small and hollow small bosses 170, 170, 178, and 178 abut and so the large and large hollow bosses 168, 168, 176 and 176 abut (FIG. 22).

The opposite side 180 of spacing plate 138 includes, as the first side, a border 164, inset and extending therearound, the through aperture 166 and a series of large bosses 182, 182 and small bosses 184, 184. These bosses are sized and shaped in and spaced in plan similarly to the large and small bosses 168, 168 170 and 170 formed on the first side face 162 of spacing plate 138. These bosses differ only in height from the bosses on the first side but are identical in height to each other. Four different adjustments of the face plate carrying valve door can thereby be had by proper utilization of spacer plate 138. This gives an extreme degree of flexibility to the wall valve 10' in its accommodation of varying room wall thicknesses.

Figure 23:
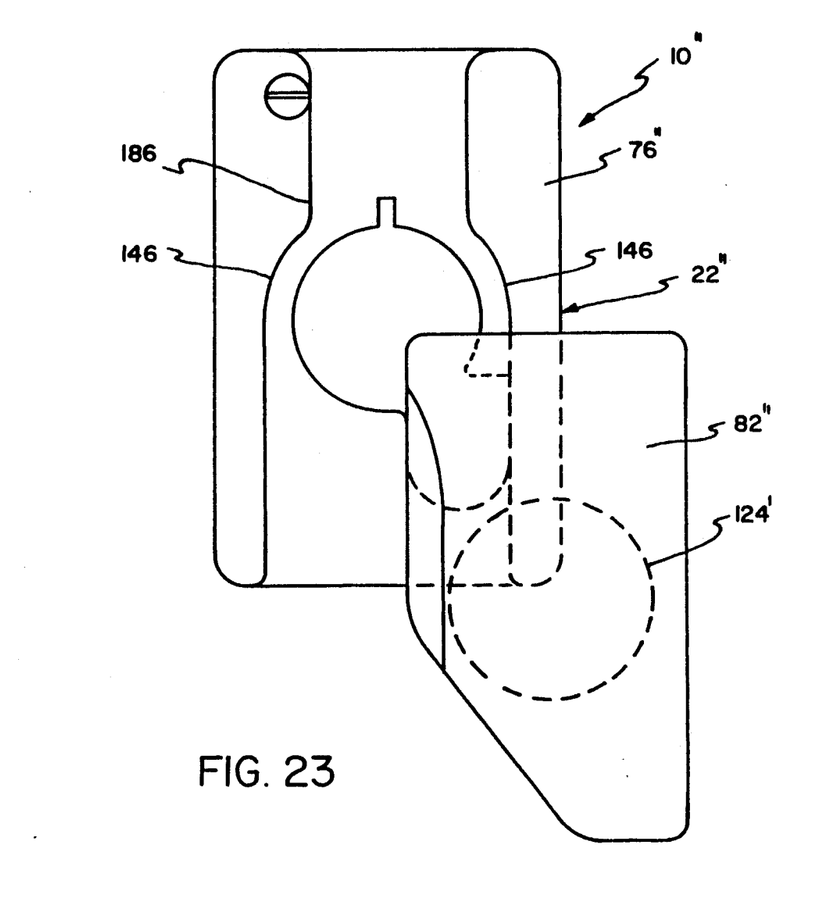
FIG. 23 is a front elevational view of a preferred wall plate and hinged valve door to be utilized with the second embodiment.
Figure 24:
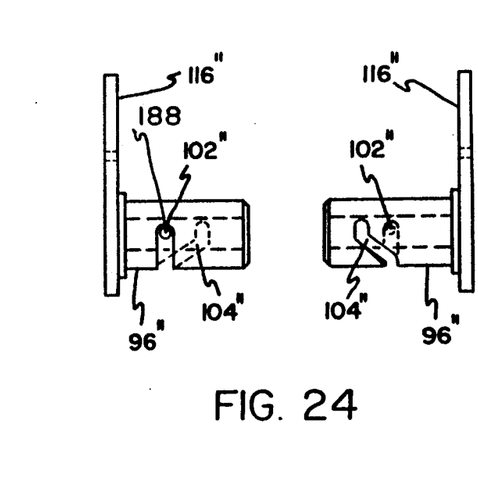
FIG. 24 is a left and right hand view of the camming shaft and pin arrangement of the valve door shown in FIG. 23.

The wall plate and valve door configuration shown in FIG. 23 is preferred and can be mounted with the wall valve configuration of the second embodiment. It utilizes double primed numbers for similar elements and includes a wall plate 22" having a pair of oppositely disposed integral outwardly extending ribs 76", 186, with the rib 186 being of less depth to insure that a door seal 124' provides a proper seal for the wall valve 10" when the door valve 82" is closed. The ribs 76" and 186 are otherwise shaped similarly to rib 76', but oppositely disposed to provide curvilinear portion 146, 146 which meld with the inserted hose coupling 18.

Insertion of the hose coupling 18 is substantially similar in the wall valve 10" except that the door 82" can be swung through a full 180 (partially manually, if necessary) to provide slightly more flexibility to this valve configuration.

The cylindrical cam arrangement to accomplish this additional swinging of valve door 82" includes a cam track slot 104" of approximately 180 extent, extending around a hollow cylindrical cam piece 96". Since the cam track is so extensive, a cross pin 102" can only extend through one wall of the cylindrical cam piece 96". Thus, it must be tightly held in a pin bore 188 in cylindrical cam piece 96". Since the cylindrical cam piece is within a bore 97 (e.g., FIG. 6) sufficient guidance to the structure occurs even through cross pin 102" is not guidingly riding in oppositely disposed cam slots.

It should be clear that the objects of the invention set out at the beginning of the description have been fully met by the structure disclosed. It should also be obvious that many changes could be made to it which would still fall within its spirit and tenure.

What is claimed is:

1. A wall valve for use with a central vacuum system comprising;
   a) a valve port for communicating with said central vacuum system;
   b) means for mounting said wall valve in a room wall having an exposed planar surface; and c) a valve door covering said valve port, having a surface suitable for engagement by a suction hose, and pivoting on an axis perpendicular to said planar surface of said wall.

2. The wall valve of claim 1 wherein;
a) said valve includes a plate like member mounted adjacent to said planar surface of said wall,
b) said plate like member includes guiding means for directing said suction hose towards said engagement surface of said valve door.

3. The wall valve of claim 2 wherein;
a) said guiding means opens upwardly to enable initial downward guiding movement of said hose.

4. The wall valve of claim 2 wherein;
a) said guiding means is disposed to guide opposite sides of said hose.

5. The wall valve of claim 2 wherein;
a) said guiding means is disposed to guide only one side of said hose.

6. The wall valve of claim 2 wherein;
a) said guiding means includes a curved portion to accommodate final insertion of said hose in said valve.

7. The wall valve of claim 1 wherein;
a) said valve door is substantially rectangular in elevation.

8. The wall valve of claim 1 wherein;
a) said valve door swings from a substantially upright vertical position to a substantially downward vertical position to thereby subtend a swinging arc of substantially 180°.

9. The wall valve of claim 1 wherein;
a) said wall valve includes fixed guidance means for said suction hose,
b) said fixed guidance means comprising ribs being spaced apart to provide a way for guiding downward movement of said suction hose, each of said ribs extending below an insertion port of said valve for insertion of said suction hose.

10. The wall valve of claim 1 wherein;
a) said engagement surface of said valve door includes at least a vertically oriented upwardly and inwardly urged straight side to provide a camming surface engageable by a cylindrical periphery of said suction hose.

11. The wall valve of claim 1 wherein;
a) said engagement surface of said valve door includes a camming surface engageable by a flat face on said suction hose to move said valve door towards open position.

12. The wall valve of claim 11 wherein;
a) said camming surface is formed in a thickness of said door,
b) said thickness being the thickness between front and rear sides of said door.

13. A wall valve for use with a central vacuum system comprising;
a) a valve port for communicating with said central vacuum system;
b) means for mounting said wall valve in a room wall having an exposed planar surface; and
c) a valve door covering said valve port, having a surface suitable for engagement by a suction hose, pivoting on an axis perpendicular to said planar surface of said wall, and moving inwardly and outwardly along said perpendicular axis when said valve door is turned.

14. The wall valve of claim 13 wherein;
a) said inward and outward and pivoting movement of said valve door is occasioned by cylindrical cam slot formed in a mounting means for said door,
b) said cam slot having a lead and circumferential extent to thereby provide said movement of said valve door.

15. The wall valve of claim 14 wherein;
a) said cam slot is formed in a wall of a hollow cylindrical member, and
b) a follower for said cam slot mounts said door.

16. The wall valve of claim 15 wherein;
a) said follower consists of a door mounting pivot pin disposed in a bore formed by said hollow cylindrical member, and
b) a cross pin inserted in said pivot pin and riding in said cam slot.

17. The wall valve of claim 16 wherein;
a) said cam extends around said hollow cylindrical body substantially 180°.

18. The wall valve of claim 16 wherein;
a) said cross pin extends outwardly of said pivot pin on only one side of said pivot pin.

19. A spacing plate utilizable with a wall mounted valve for a central vacuum system including;
a) said wall valve including a front plate having boss like engagements on its rear side,
b) said spacer plate having boss like engagements on at least one of its sides;
c) said bosses on said front plate and on said spacer plate being aligned and equally spaced,
d) at least some of said bosses on said spacer plate and said front plate being hollow and larger than the remainder of said bosses,
e) said smaller bosses capable of fitting telescopically into said hollow larger bosses,
f) said bosses being alignable at least two ways, with said small and large bosses on said front plate and spacing plate abutting and with said small bosses received telescopically in said large bosses,
g) whereby said spacing plate and said front plate, when assembled, may have at least two thicknesses.

20. The spacing plate of claim 19 wherein;
a) said spacing plate has small and large bosses on both of its sides.

21. The spacing plate of claim 19 wherein;
a) said spacing plate includes a border extending therearound,
b) said bosses on said spacing plate being disposed within said border.

* * * * *